J. R. Henshaw,
Snap Hook,

No. 28,669. Patented June 12, 1860.

Witnesses.

Inventor.

UNITED STATES PATENT OFFICE.

JOHN R. HENSHAW, OF MIDDLETOWN, CONNECTICUT.

MOUSING-HOOK.

Specification of Letters Patent No. 28,669, dated June 12, 1860.

*To all whom it may concern:*

Be it known that I, J. R. HENSHAW, of Middletown, in the county of Middlesex and State of Connecticut, have invented a new and useful Improvement in that Class of Hooks Termed the "Mousing-Hook;" and I do hereby declare that the following is a full, clear, and exact description thereof, reference being had to the accompanying drawing, forming a part of this specification, in which—

Figure 1:
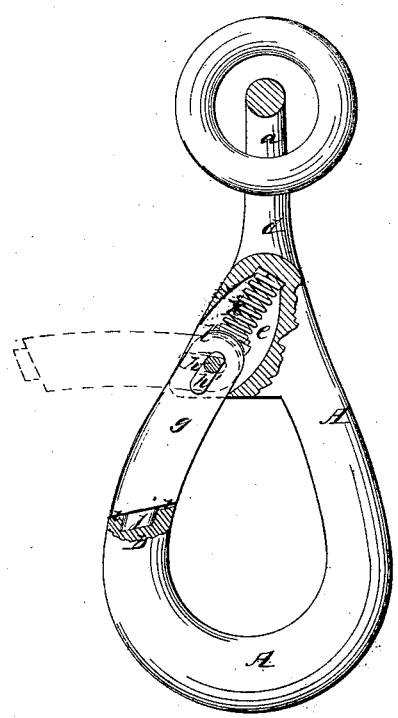
Figure 2:
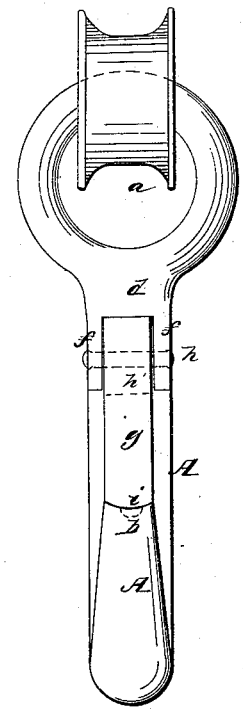

Figure 1 is a side sectional view of my improved hook, showing the snap or spring-bar in its two positions. Fig. 2 is an edge view of same.

Similar letters of reference indicate corresponding parts in the two figures.

In the drawings, A represents a hook made of metal and having an eye, a, formed on one end as usual. The point or end b, of the hook is made oblique, or is beveled outward, as clearly shown by Fig. 1, and a suitable hole is drilled centrally in this end b. Directly under the eye, a, and in the crotch of the shank, d, is formed a deep recess or socket, e, having two ears, f f, projecting down from each side of the shank, d. Within this socket, e, one end of a bar, g, is pivoted, as shown at h, by the pin passing through a slot h', in said bar, g. The opposite end of this bar, g, is beveled, as shown at i, and corresponding inversely with the end, b, of the hook A, as shown clearly by Fig. 1, the end, i, having a tenon, j, projecting from it, which fits into the hole in the end, b, of the hook.

Within the socket, e, a spiral spring, k, is fitted, which presses against the upper end of the socket and down on the pivoted end of the bar, g, and between the spring k, and the end of the bar, g, a cap, l, is interposed, which is fitted on the rounded end of the bar, g, so as to permit this bar to vibrate freely without displacing the spring, k. This spring acts upon the bar, g, with a downward pressure, so as to forcibly hold its pin, j, in place in the hole in the end, b, of the hook, so as to resist either inward or outward or lateral pressure. The slot, h', in the bar, g, allows the bar to be raised the length of the tenon, j, when the bar may be raised to the position represented in red lines, Fig. 1. The spring k, acts constantly on the bar, g, and will hold it in any position in which it may be placed.

From the above description it will be seen that the hook may be readily attached to a thimble or any loop by opening the bar, g, and when the hook is attached the bar, g, is closed and locked by the pin, j, and spring, k, acting upon it. The bar will thus prevent the hook from getting detached, or the loop from being accidentally thrown out of the hook. While at the same time the bar, g, cannot possibly be forced inward either accidentally or intentionally; it will thus be free from entangling itself among the tackling, and will allow a rope to be detached from it more readily than when the tongue or bar is made to spring inward.

The spring, k, in this invention is better confined and consequently less liable to injury than with hooks made after my patent of October 26, 1858.

Having thus described my invention and improvement in mousing hooks, I claim as new, and desire to secure by Letters Patent—

A mousing hook having a slotted bar g, arranged to open outward as shown so that it cannot become entangled in the rigging, when otherwise made as herein represented and described.

JOHN R. HENSHAW.

Witnesses:
  JONATHAN BARNES,
  CLARK ELLIOTT.